US011496359B2

(12) United States Patent
Basu Mallick et al.

(10) Patent No.: US 11,496,359 B2
(45) Date of Patent: Nov. 8, 2022

(54) SYSTEM INFORMATION FOR CHANGING A CONFIGURATION

(71) Applicant: Motorola Mobility LLC, Chicago, IL (US)

(72) Inventors: Prateek Basu Mallick, Dreieich (DE); Joachim Loehr, Wiesbaden (DE); Ravi Kuchibhotla, Clarendon Hills, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/516,878

(22) Filed: Jul. 19, 2019

(65) Prior Publication Data

US 2019/0342165 A1   Nov. 7, 2019

Related U.S. Application Data

(63) Continuation of application No. 15/464,073, filed on Mar. 20, 2017, now Pat. No. 10,505,799.

(51) Int. Cl.
*H04L 41/0813* (2022.01)
*H04L 5/00* (2006.01)
*H04W 80/00* (2009.01)

(52) U.S. Cl.
CPC ........ *H04L 41/0813* (2013.01); *H04L 5/0053* (2013.01); *H04L 5/0091* (2013.01); *H04W 80/00* (2013.01)

(58) Field of Classification Search
None
See application file for complete search history.

(56) References Cited

U.S. PATENT DOCUMENTS

| 2002/0168985 | A1* | 11/2002 | Zhao | G01S 19/071 |
| | | | | 455/456.1 |
| 2008/0316964 | A1* | 12/2008 | Fischer | H04W 76/27 |
| | | | | 370/329 |
| 2010/0165901 | A1* | 7/2010 | Kim | H04W 72/005 |
| | | | | 370/312 |
| 2010/0191965 | A1* | 7/2010 | Fischer | H04L 63/123 |
| | | | | 713/168 |
| 2011/0117912 | A1* | 5/2011 | Mahajan | H04W 48/12 |
| | | | | 455/434 |
| 2012/0052860 | A1 | 3/2012 | Faronius et al. | |

(Continued)

FOREIGN PATENT DOCUMENTS

EP  2493223 A1 * 8/2012 ............ H04W 48/16

OTHER PUBLICATIONS

PCT/US2018/023359, "Notification of Transmittal of the International Search Report and the Written Opinion of the International Searching Authority, or the Declaration", dated Jun. 22, 2018, pp. 1-11.

*Primary Examiner* — Gregory B Sefcheck
*Assistant Examiner* — Amarnauth G Persaud
(74) *Attorney, Agent, or Firm* — Kunzler Bean & Adamson

(57) ABSTRACT

Apparatuses, methods, and systems are disclosed for transmitting and/or receiving system information for changing a configuration. One apparatus includes a receiver that: receives first system information for a first configuration; and receives second system information for a second configuration based on the first configuration. The second system information includes changes to the first configuration without repeating information common to the first and second configurations.

12 Claims, 8 Drawing Sheets

(56) References Cited

U.S. PATENT DOCUMENTS

| | | | |
|---|---|---|---|
| 2012/0220329 A1 | 8/2012 | Kitazoe et al. | |
| 2015/0382284 A1* | 12/2015 | Brismar | H04W 28/085 370/329 |
| 2016/0007323 A1 | 1/2016 | Suzuki et al. | |
| 2016/0174135 A1* | 6/2016 | Yan | H04W 48/20 455/434 |
| 2016/0270013 A1* | 9/2016 | Soriaga | H04W 56/001 |
| 2016/0345325 A1* | 11/2016 | Liu | H04L 5/0048 |
| 2016/0353308 A1 | 12/2016 | Kim et al. | |
| 2016/0366665 A1 | 12/2016 | Xia | |
| 2017/0048920 A1* | 2/2017 | Kim | H04W 48/16 |
| 2017/0064764 A1* | 3/2017 | Ke | H04W 72/1289 |
| 2017/0127470 A1 | 5/2017 | Vajapeyam et al. | |
| 2017/0171797 A1 | 6/2017 | Nigam et al. | |
| 2017/0231021 A1* | 8/2017 | Tavildar | H04W 52/02 |
| 2018/0020394 A1* | 1/2018 | da Silva | H04W 52/0222 |
| 2018/0049107 A1* | 2/2018 | Johansson | H04W 48/10 |
| 2018/0077660 A1* | 3/2018 | Ly | H04W 4/027 |
| 2018/0124601 A1* | 5/2018 | Vutukuri | H04W 12/08 |
| 2018/0167911 A1* | 6/2018 | Kota | H04W 72/02 |
| 2018/0167918 A1* | 6/2018 | Ishii | H04W 74/006 |
| 2018/0220361 A1* | 8/2018 | Cheng | H04L 5/0091 |
| 2019/0158988 A1* | 5/2019 | Lee | H04W 76/27 |
| 2019/0174554 A1* | 6/2019 | Deenoo | H04W 56/001 |
| 2019/0268830 A1* | 8/2019 | Kim | H04W 36/0072 |
| 2019/0349842 A1* | 11/2019 | Lee | H04W 48/12 |
| 2020/0022067 A1* | 1/2020 | Pan | H04W 48/14 |
| 2020/0045743 A1* | 2/2020 | Lee | H04W 74/0833 |
| 2020/0305066 A1* | 9/2020 | Ishii | H04W 48/10 |
| 2020/0305197 A1* | 9/2020 | Kim | H04W 72/0446 |

\* cited by examiner

SYSTEM INFORMATION FOR CHANGING A CONFIGURATION

CROSS REFERENCE TO RELATED APPLICATIONS

This application is a continuation of application Ser. No. 15/464,073 filed on Mar. 20, 2017, which is hereby incorporated by reference in its entirety.

FIELD

The subject matter disclosed herein relates generally to wireless communications and more particularly relates to system information for changing a configuration.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NAK"). ACK means that a TB is correctly received while NAK means a TB is erroneously received.

In certain wireless communications networks, some system information may be transmitted and/or received more often than is necessary. In some configurations, indexes and/or identifiers may be transmitted in system information and used by UEs to enable the UEs to avoid reacquisition of already stored system information.

In certain configurations, there may be a large number of indexes and/or identifiers. For example, each system information block or collection of system information blocks may include a large number of parameters. A given network may use particular values of each parameter to configure the UEs in the network at a given point of time. An index and/or identifier for each possible configuration of parameters may be very large. In certain configurations, UEs may store a configuration corresponding to each index and/or identifier. This may take a large amount of storage space for the UEs. Moreover, a large load may be placed on a network transmitting each configuration corresponding to each index and/or identifier and UEs may store a large number of configurations taking up considerable storage space. In various configurations, there may be a small number of indexes and/or identifiers. In such configurations, there may be a limited number of configurations available to UEs.

BRIEF SUMMARY

Apparatuses for receiving system information for changing a configuration are disclosed. Methods and systems also perform the functions of the apparatus. In one embodiment, the apparatus includes a receiver that: receives first system information for a first configuration; and receives second system information for a second configuration based on the first configuration. In various embodiments, the second system information includes changes to the first configuration without repeating information common to the first and second configurations.

In one embodiment, the first system information includes a system information block. In a further embodiment, the second system information includes changes to parameter values of the system information block. In certain embodiments, the second system information includes additional parameters to those in the system information block. In various embodiments, the second system information indicates that it is based on the first system information. In some embodiments, the first system information, the second system information, or some combination thereof is discarded after a predetermined period of time.

A method for receiving system information for changing a configuration, in one embodiment, includes receiving first system information for a first configuration. In various embodiments, the method includes receiving second system information for a second configuration based on the first configuration. In certain embodiments, the second system information includes changes to the first configuration without repeating information common to the first and second configurations.

In one embodiment, an apparatus includes a transmitter that transmits first system information for a first configuration. In certain embodiments, the first configuration includes multiple system information blocks. In various embodiments, the transmitter transmits second system information indicating system information blocks of the multiple system information blocks that have a second configuration available to be transmitted. In some embodiments, the second configuration is based on the first configuration and includes changes to the first configuration without repeating information common to the first and second configurations.

In one embodiment, the second system information includes a list of system information blocks that are not included in the first system information. In a further embodiment, the second system information includes scheduling information for system information blocks of the list of system information blocks. In certain embodiments, the second system information includes scheduling information for information corresponding to the second configuration of the indicated system information blocks of the multiple system information blocks that have the second configuration available to be transmitted. In various embodiments, the second system information includes information indicating whether the second configuration for the indicated system information blocks of the multiple system information blocks is broadcast by default, broadcast by demand, or some combination thereof.

In some embodiments, the transmitter transmits third system information indicating the second configuration for the indicated system information blocks of the multiple system information blocks. In one embodiment, the third system information includes changes to parameter values of the indicated system information blocks of the multiple system information blocks. In certain embodiments, the third system information includes additional parameters to those of the indicated system information blocks of the multiple system information blocks. In various embodiments, the first system information, the second system information, the third system information, or some combination thereof is discarded after a predetermined period of time. In some embodiments, the multiple system information blocks include a first system information block of a first type and a second system information block of the first type, and the first and second system information blocks are different from one another.

In one embodiment, the second system information includes scheduling information for system information blocks broadcast regularly, system information blocks not broadcast regularly, system information blocks using the first configuration without the second configuration, system information blocks using the first configuration with the second configuration, or some combination thereof. In certain embodiments, the second system information includes a two-bit indication for each system information block indicating whether the respective system information block is broadcast regularly, not broadcast regularly, uses the first configuration without the second configuration, or uses the first configuration with the second configuration.

A method for transmitting system information for changing a configuration, in one embodiment, includes transmitting first system information for a first configuration. In some embodiments, the first configuration includes multiple system information blocks. In various embodiments, the method includes transmitting second system information indicating system information blocks of the multiple system information blocks that have a second configuration available to be transmitted. In certain embodiments, the second configuration is based on the first configuration and includes changes to the first configuration without repeating information common to the first and second configurations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
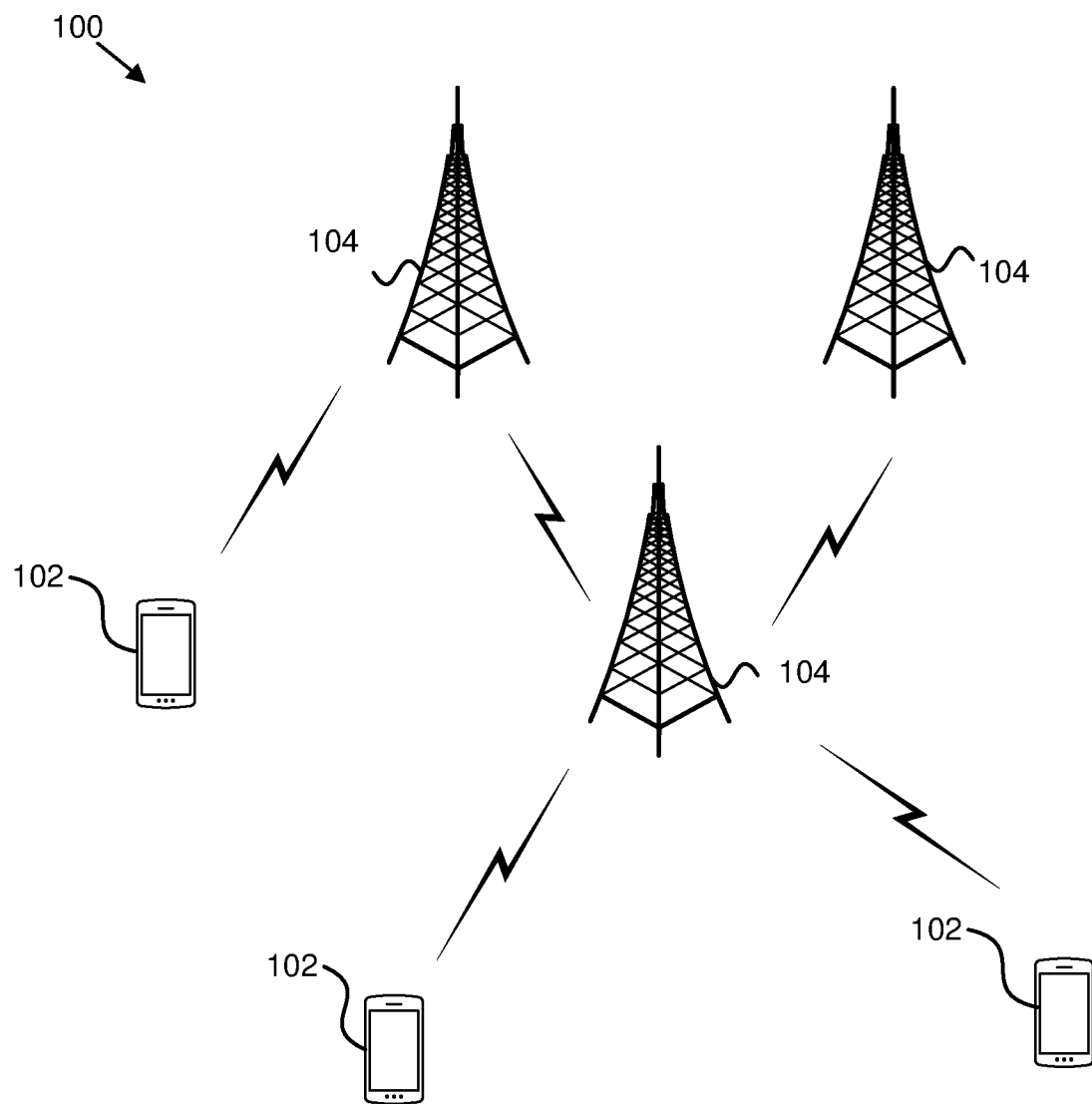
FIG. 1 is a schematic block diagram illustrating one embodiment of a wireless communication system for transmitting and/or receiving system information for changing a configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for transmitting and/or receiving system information for changing a configuration. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the LTE of the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a base unit 104 may first system information for a first configuration to the remote unit 102. In some embodiments, the first configuration may include one system information block, while in other embodiments, the first configuration may include multiple information blocks. In certain embodiments, the base unit 104 may transmit to the remote unit 102 second system information indicating system information blocks of multiple system information blocks that have a second configuration available to be transmitted. In various embodiments, the second configuration is based on the first configuration and includes changes to the first configuration without repeating information common to the first and second configurations. Accordingly, a base unit 104 may be used for transmitting system information for changing a configuration.

In another embodiment, a remote unit 102 may receive first system information for a first configuration. The remote unit 102 may receive second system information for a second configuration based on the first configuration. In some embodiments, the second system information includes changes to the first configuration without repeating information common to the first and second configurations. Accordingly, a remote unit 102 may be used for receiving system information for changing a configuration.

Figure 2:
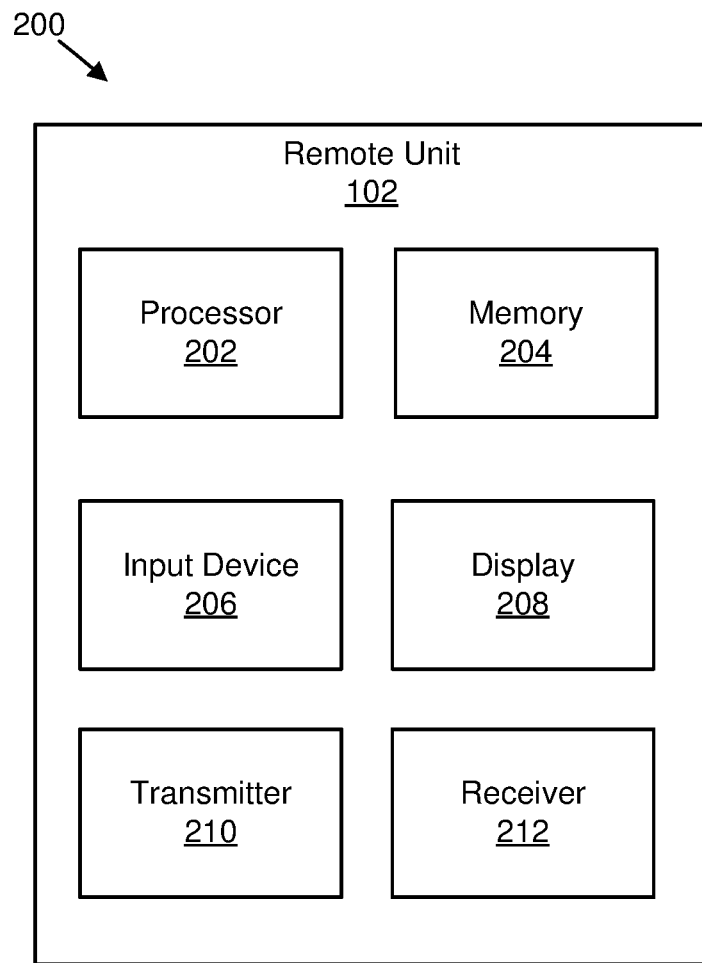
FIG. 2 is a schematic block diagram illustrating one embodiment of an apparatus that may be used for receiving system information for changing a configuration.

FIG. 2 depicts one embodiment of an apparatus 200 that may be used for receiving system information for changing a configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to various configurations. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the receiver 212 may be used to receive first system information for a first configuration (e.g., base configuration, multiple base configurations, etc.). In some embodiments, the receiver 212 may be used to receive second system information for a second configuration (e.g., delta configuration, multiple delta configurations, etc.) based on the first configuration. In certain embodiments, the second system information includes changes to the first configuration without repeating information common to the first and second configurations. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
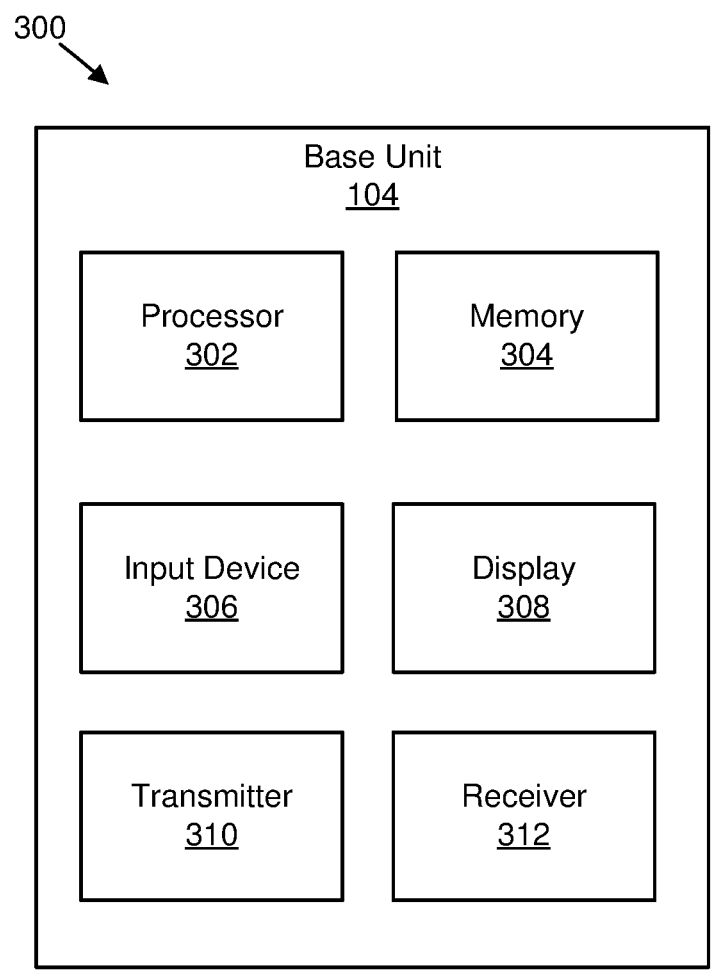
FIG. 3 is a schematic block diagram illustrating one embodiment of an apparatus that may be used for transmitting system information for changing a configuration.

FIG. 3 depicts one embodiment of an apparatus 300 that may be used for transmitting system information for changing a configuration. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In various embodiments, the transmitter 310 is used to transmit first system information for a first configuration to the remote unit 102. In some embodiments, the first configuration includes multiple system information blocks, while in other embodiments, the first configuration includes one system information block. In some embodiments, the transmitter 310 may be used to transmit second system information to the remote unit 102. In one embodiment, the second system information indicates system information blocks of the multiple system information blocks that have a second configuration available to be transmitted. In various embodiments, the second configuration is based on the first configuration and includes changes to the first configuration without repeating information common to the first and second configurations. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 4:
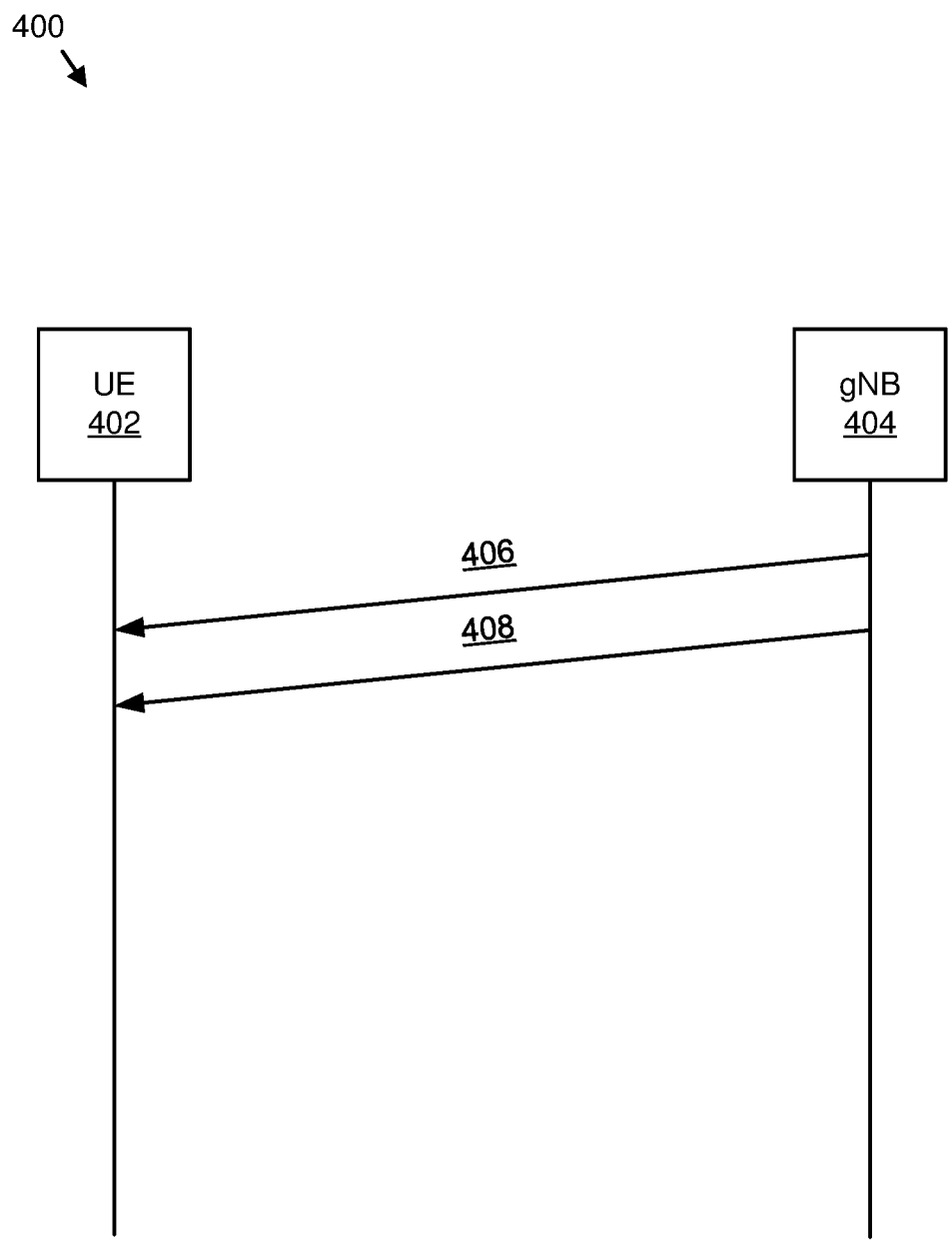
FIG. 4 illustrates one embodiment of communications for system information for changing a configuration.

FIG. 4 illustrates one embodiment of communications 400 for system information for changing a configuration. Specifically, communications 400 between a UE 402 and a gNB 404 are illustrated. The communications 400 may facilitate providing the UE 402 with various configurations.

In certain embodiments, the gNB 404 may transmit first system information 406 to the UE 402. In one embodiment, the first system information 406 includes one or more base configurations. Any system information block may have one or more base configurations. In various embodiments, there may be multiple base configurations for one system information block. Each of the base configurations may include particular values for parameters of one system information block, accordingly, each of the base configurations differ from one another because even if the base configurations are for the same system information block, the values assigned to at least some of the parameters will differ. In some embodiments, a base configuration may be identified using the following syntax $SIB_{type,\ index}$; where type refers to the content of the SIB (e.g., $SIB_2$ has a type value of "2"), and index defines a particular configuration of $SIB_2$. In various embodiments, a base configuration may have a universal scope and/or applicability or it may apply only to a limited area like a tracking area ("TA"), a radio access network ("RAN") area, a paging area, and so forth. In certain embodiments, the UE 402 may acquire and store base configurations corresponding to one or more different scopes. As used herein, "scope" may refer to a geographical area which may be a tracking area, a routing area, or a RAN area specifically designed for a purpose (e.g., a collection of cells, a RAN paging area etc.). In some embodiments, scope may be limited or universal meaning that the acquired/used or broadcasted base configuration indexes are valid in a limited area or in an entire geography like a public land mobile network ("PLMN") area. Accordingly, when a UE 402 changes its scope, the UE 402 may use only the base configurations corresponding to its new scope and, in certain embodiments, may retain the base configuration corresponding to its previous scope that can be used upon the UEs re-entry in the previous scope at a later point in time.

As used herein, base configuration ("BC") may refer to a configuration with respect to a particular SIB. In one example, there may be 20 SIBs defined. A first cell/network might broadcast only 18 of the 20 defined SIBs because of various features that the first cell/network does not support. Out of 18 broadcast SIBs, 10 SIBs (e.g., $SIB_2$ to $SIB_{11}$) may be provided using a base configuration and the remaining 8 SIBs may be transmitted in full (e.g., either broadcast regularly or provided on-demand). For the 10 SIBs that have a base configuration, some SIBs may have one base configuration (e.g., BC-a) while other SIBs may have multiple base configurations (e.g., BC-a, BC-b, BC-c, etc.). For example, $SIB_2$ might use BC-a for $SIB_2$, while $SIB_3$ might use BC-b for $SIB_3$, and $SIB_4$ might use BC-a for $SIB_4$, and so forth. A second cell/network might provide only 5 SIBs (e.g., $SIB_{10}$ to $SIB_{14}$) using a base configuration. In certain embodiments, a UE may request BCs of a current cell/network (e.g., the first cell/network) and/or a neighboring cell/network (e.g., the second cell/network).

In some embodiments, the UE 402 may store the first system information 406 and use the first system information 406 for multiple different cells/networks that are part of the same scope. For example, when the UE 402 moves out of one cell/network into another cell/network, the UE 402 may keep the first system information 406 stored. Moreover, the first system information 406 may remain unchanged when the UE 402 moves between cells/networks.

In some embodiments, the gNB 404 may transmit additional system information 408 (e.g., second system information, third system information, etc.) to the UE 402. In certain embodiments, the first system information 406 and/or the additional system information 408 may be transmitted together. In various embodiments, the first system information 406 and/or the additional system information 408 may be considered system information or first system information.

In certain embodiments, the additional system information 408 may include system information (e.g., second or third system information) for a second configuration (e.g., delta configuration) based on the first configuration. In some embodiments, the second configuration includes changes to the first configuration without repeating information common to the first and second configurations. In various embodiments, the second configuration may refer to one or more delta configurations for one or more system information blocks. In one embodiment, the term "Delta-SI" may refer to a parameter set in which parameters have been assigned values different from the values assigned to a base configuration. The Delta-SI may include only the parameter set out of the base configuration that has parameters different from the base configuration. In other words, the Delta-SI may be considerably smaller in size than the base configuration because it only includes parameters for a delta configuration that are changed from the base configuration. In some embodiments, a base configuration that is closest to a configuration that a current cell/network needs may be called a "referred base configuration." In certain embodiments, a cell/network may choose a referred base configuration from a set of base configurations for a given SIB and may signal a Delta-SI along with the referred base configuration to the UEs in the cell/network. Accordingly, the UEs in the cell/network may use the configuration from the referred base configuration except for the parameter set found in the Delta-SI. In various embodiments, upon leaving the cell/network, the UE 402 may delete any Delta-SIs so that the configuration of the referred base configuration remains the same as it was before the UE 402 entered the cell/network.

In some embodiments, there may be more than one base configuration for a particular type of SIB. For example, for $SIB_2$, there may be two base configurations, a' and b' denoted $SIB_{2,\ a'}$ and $SIB_{2,\ b'}$, respectively. In one embodiment, a particular cell/network may find $SIB_{2,\ a'}$ to be the most suitable and may only need to change a few of the parameter values of $SIB_{2,\ a'}$. In certain embodiments, Delta-SI may contain new values of an existing parameter of a particular SIB. In some embodiments, Delta-SI may contain new parameters for a particular SIB. In various embodiments, Delta-SI may contain new values of an existing parameter of a particular SIB and/or new parameters for the particular SIB.

Changes made by a cell/network may be one of many different types. For example, the cell/network may change from using a fully transmitted SIB (e.g., an SIB transmitted with actually signaling values of all parameters required in the cell/network) to a particular base configuration of the same SIB (e.g., type 1 change). A UE that receives this type 1 change may start using the new values corresponding to the particular base configuration if it has this base configuration for this SIB stored; otherwise, it may initiate acquisition of the SIB (e.g., based on scheduling information using broadcast channel or using an on-demand system information request procedure). As another example, the cell/network may change from using a base configuration of an SIB to using a fully transmitted SIB (e.g., type 2 change). As a further example, the cell/network may change from using a first base configuration of an SIB having a certain type to a second base configuration of the same SIB (e.g., type 3 change). As an additional example, the cell/network may change from using a first Delta-SI for an SIB to using a second Delta-SI for the SIB (e.g., type 4 change) and for this change the base configuration in which the second Delta-SI is applied remains the same (e.g., the same base configuration in which the first Delta-SI was being applied).

Depending on whether the type of change is a type 1 change, a type 2 change, a type 3 change, or a type 4 change, different combinations of a value tag, minimum system information, and/or paging messages may be used. For example, for a type 1 change, the change may be indicated in a paging message directly. As another example, for a type 1 change, the minimum system information may indicate the change and the UE 402 may notice the change with every minimum system information modification period (e.g., every 80 ms, etc.). As a further example, for a type 2 change, a paging message may indicate an SIB/system information change without carrying the content of the change. In such an example, the UE 402 may acquire the changed SIB/system information starting from the reacquisition of minimum system information, then scheduling information, and then the SIB. As another example, a type 3 change may be done like a type 1 change. Furthermore, as an additional example, a type 4 change may be done by either a type 1 or a type 2 change, depending on the volume of the change.

In one embodiment, the system information includes scheduling information for system information blocks broadcast regularly, system information blocks not broadcast regularly, system information blocks using the first configuration without the second configuration, system information blocks using the first configuration with the second configuration, or some combination thereof. In certain embodiments, the second system information includes a two-bit indication for each system information block indicating whether the respective system information block is broadcast regularly, not broadcast regularly, uses the first configuration without the second configuration, or uses the first configuration with the second configuration. Further, the second system information may indicate if the second configuration(s) for their corresponding system information block(s) are broadcast regularly or not broadcast regularly. For system information block(s) or for second configuration(s) indicated as not broadcast regularly, the UE may need to request them on an on-demand basis (e.g., request them using a RACH procedure). Two methods are applicable here; one, in which a UE transmits a particular specified/configured preamble to signal the SIB(s) or SI(s) that it is requesting; second, in which the UE includes detailed information about its required SIB(s) or SI(s) optionally with the base configurations that it needs in a current cell/network or in a different cell/network within the geographical scope using a RACH message 3 ("msg3"). The detailed information could be a bitmap having one bit for each of the SIB-type and the UE sets the bit(s) corresponding to the SIB-type(s) that it does not have stored. In one particular embodiment, the UE may request the exact base configurations for each SIB-type that it needs.

The UE 402 may discard (e.g., delete, remove, etc.) base configurations in one of many different ways. For example, in one embodiment, base configurations may not be discarded unless explicitly signaled by a cell/network to discard one or more of the base configurations. In certain embodiments, a cell/network may explicitly signal to discard a particular base configuration, all base configurations of one SIB, and/or all base configurations of many SIBs. As another example, in some embodiments, every base configuration and/or SIB may have a built-in three hour discard timer so that after three hours the respective base configuration and/or SIB will be discarded. The three hour discard time may begin running at a time that the base configuration and/or SIB configuration is received by the UE 402 or at a time that the base configuration and/or SIB is transmitted from the gNB 404. As a further example, in various embodiments, a cell/network may configure which base configurations and/or SIBs are subject to a three hour discard, which base configurations and/or SIBs are not subject to a three hour discard, and/or when the three hour discard timer is started. As yet another example, in certain embodiments, every base configuration and/or SIB may be discarded every three hours. In certain embodiments, a UE 402 may request that a cell/network provide any unavailable (or discarded) SIBs or system information on an as-needed (e.g., on-demand) basis.

Figure 5:
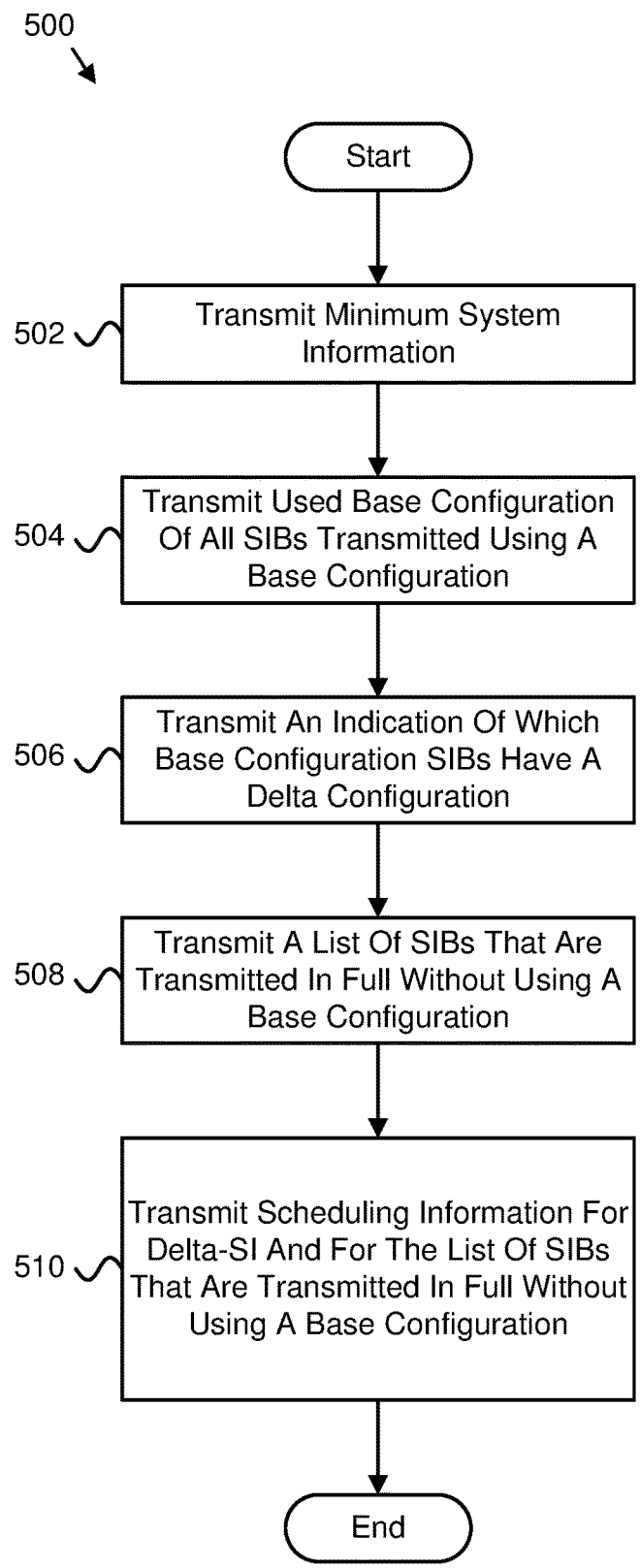
FIG. 5 is a schematic flow chart diagram illustrating one embodiment of a method for transmitting system information for changing a configuration.

FIG. 5 is a schematic flow chart diagram illustrating one embodiment of a method 500 for transmitting system information for changing a configuration. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include transmitting 502 minimum system information. In certain embodiments, the minimum system information may include information indicating PBCH, portions of $SIB_1$ for using and/or accessing a cell/network, portions of $SIB_2$ for using and/or accessing a cell/network, and so forth. The method 500 may also include transmitting 504 a used base configuration of all SIBs that are transmitted using a base configuration. The method 500 may include transmitting 506 an indication of which base configuration SIBs have a delta configuration (e.g., "Delta-SIB"). The method 500 may also include transmitting 508 a list of SIBs that are transmitted in full without using a base configuration (e.g., SIBs that are available on-demand by a remote unit 102, "remaining SIBs"). The method 500 may include transmitting 510 scheduling information for Delta-SI and for the list of SIBs that are transmitted in full without using a base configuration. In some embodiments, Delta-SIBs may be carried as part of one or more Delta-SI. For example, in one embodiment, there may be system information carrying only Delta-SIBs. In certain embodiments, most SIBs are carried in system information ("SI") messages and mapping of SIBs to SI messages is flexibly configurable by a scheduling information list included in minimum system information (e.g., second system information), with certain restrictions for example: each SIB is contained only in a single SI message, and at most once in that message; only SIBs having the same scheduling requirement (e.g., periodicity) may be mapped to the same SI message etc. In certain embodiments, different SI messages may carry one or more SIBs in full or in delta, the used base configuration of one or more SIBs, or a combination thereof, where SI is transmitted according to the scheduling information. In various embodiments, a special SI message may carry some or all Delta-SIB configurations.

Figure 6:
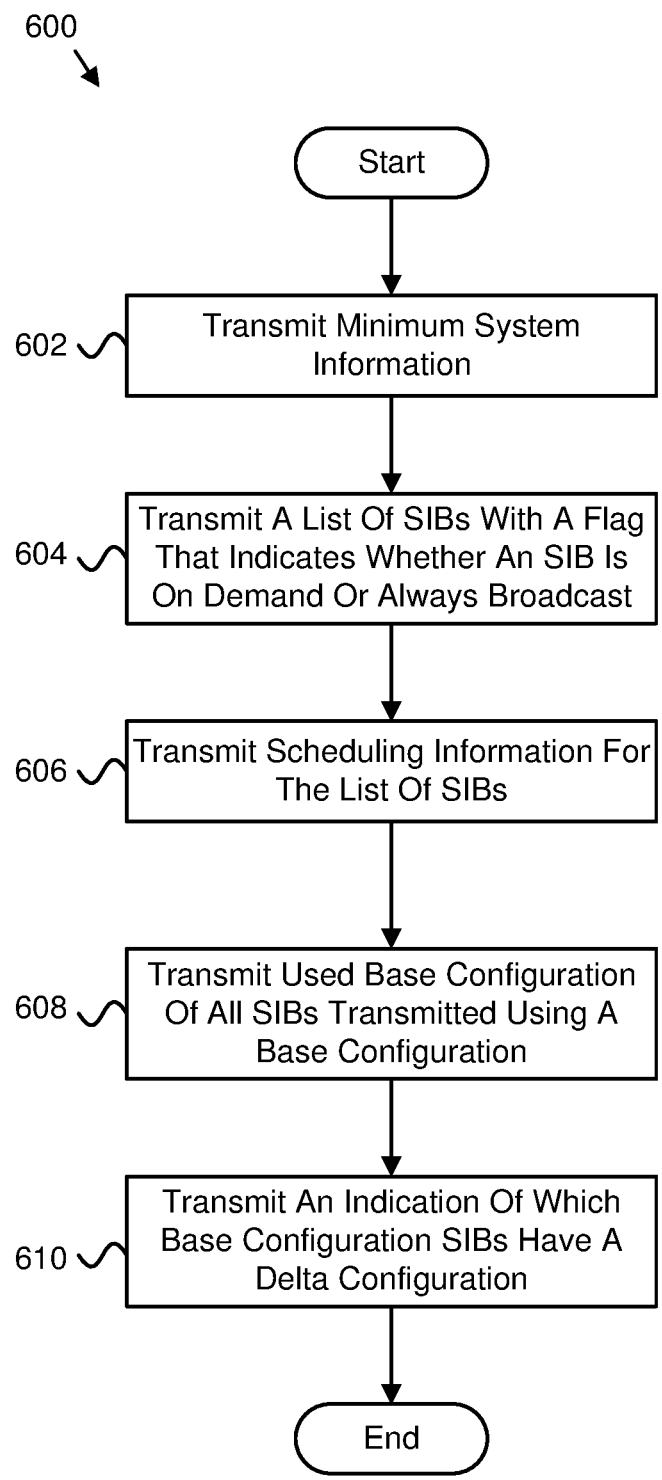
FIG. 6 is a schematic flow chart diagram illustrating another embodiment of a method for transmitting system information for changing a configuration.

FIG. 6 is a schematic flow chart diagram illustrating another embodiment of a method 600 for transmitting system information for changing a configuration. In some embodiments, the method 600 is performed by an apparatus, such as the base unit 104. In certain embodiments, the method 600 may be performed by a processor executing program code, for example, a microcontroller, a microprocessor, a CPU, a GPU, an auxiliary processing unit, a FPGA, or the like.

The method 600 may include transmitting 602 minimum system information. In certain embodiments, the minimum system information may include information indicating PBCH, portions of $SIB_1$ for using and/or accessing a cell/network, portions of $SIB_2$ for using and/or accessing a cell/network, and so forth. The method 600 may also include transmitting 604 a list of SIBs that are transmitted. In one embodiment, a flag may be transmitted with an SIB in the list indicating whether the SIB is always transmitted or transmitted on-demand (e.g., when requested). The method 600 may include transmitting 606 scheduling information for the list of SIBs. The method 600 may also include transmitting 608 a used base configuration of each SIB that is transmitted using a base configuration. The method 600 may include transmitting 610 an indication of which base configuration SIBs have a delta configuration (e.g., "Delta-SIB"). In certain embodiments, a system information message may carry one or more SIBs. For example, in one embodiment, the system information carries information for two SIBs, one that a Delta-SIB and uses a base configuration and another that is a full SIB.

Figure 7:
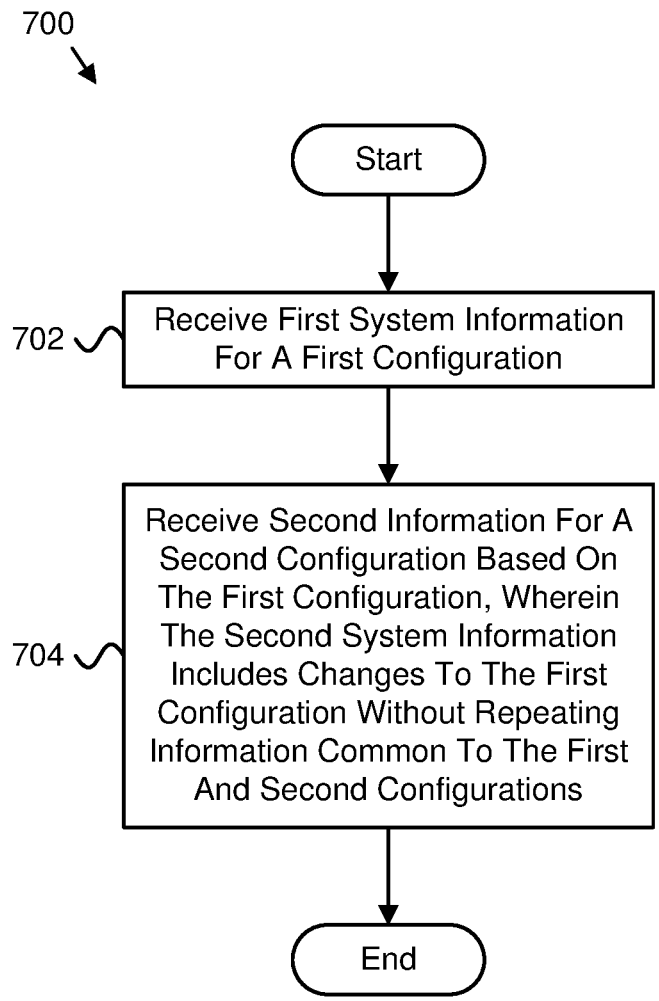
FIG. 7 is a schematic flow chart diagram illustrating one embodiment of a method for receiving system information for changing a configuration.

FIG. 7 is a schematic flow chart diagram illustrating one embodiment of a method 700 for receiving system information for changing a configuration. In some embodiments, the method 700 is performed by an apparatus, such as the remote unit 102. In certain embodiments, the method 700 may be performed by a processor executing program code, for example, a microcontroller, a microprocessor, a CPU, a GPU, an auxiliary processing unit, a FPGA, or the like.

The method 700 may include receiving 702 first system information for a first configuration. The method 700 also includes receiving 704 second system information for a second configuration based on the first configuration. In certain embodiments, the second system information includes changes to the first configuration without repeating information common to the first and second configurations.

In one embodiment, the first system information includes a system information block. In another embodiment, the first system information may include multiple system information blocks. In a further embodiment, the second system information includes changes to parameter values of one or more system information blocks. In certain embodiments, the second system information includes additional parameters to those in the system information block. In various embodiments, the second system information indicates that it is based on the first system information. In some embodiments, the first system information, the second system information, or some combination thereof is discarded (e.g., deleted) after a predetermined period of time.

Figure 8:
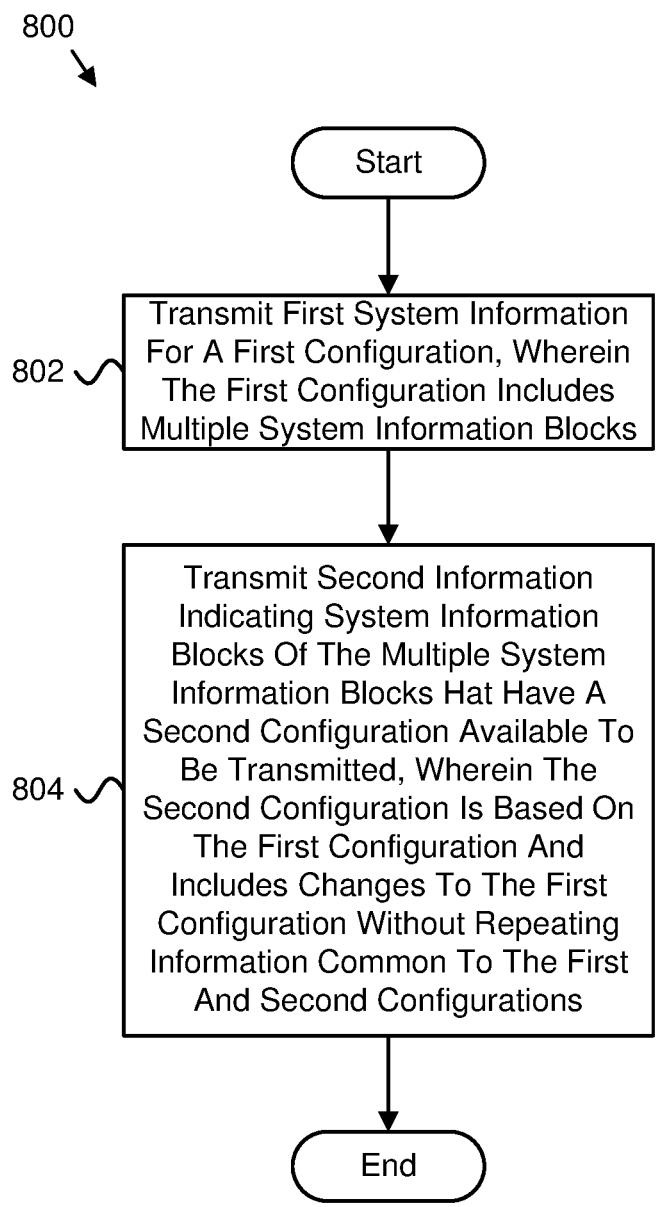
FIG. 8 is a schematic flow chart diagram illustrating a further embodiment of a method for transmitting system information for changing a configuration.

FIG. 8 is a schematic flow chart diagram illustrating a further embodiment of a method 800 for transmitting system information for changing a configuration. In some embodiments, the method 800 is performed by an apparatus, such as the base unit 104. In certain embodiments, the method 800 may be performed by a processor executing program code, for example, a microcontroller, a microprocessor, a CPU, a GPU, an auxiliary processing unit, a FPGA, or the like.

The method 800 may include transmitting 802 first system information for a first configuration for a remote unit 102. In some embodiments, the first configuration includes one or more system information blocks. The method 800 also includes transmitting 804 second system information indicating system information blocks of one or more system information blocks that have a second configuration available to be transmitted. In various embodiments, the second configuration is based on the first configuration and includes changes to the first configuration without repeating information common to the first and second configurations.

In one embodiment, the second system information includes a list of system information blocks that are not included in the first system information. In a further embodiment, the second system information includes scheduling information for system information blocks of the list of system information blocks. In certain embodiments, the second system information includes scheduling information for information corresponding to the second configuration of the indicated system information blocks of the one or more system information blocks that have the second configuration available to be transmitted. In various embodiments, the second system information includes information indicating whether the second configuration for the indicated system information blocks of the one or more system information blocks is broadcast (e.g., transmitted) by default, broadcast by demand, or some combination thereof.

In some embodiments, the transmitter transmits third system information indicating the second configuration for the indicated system information blocks of the one or more system information blocks. In one embodiment, the third system information includes changes to parameter values of the indicated system information blocks of the one or more system information blocks. In certain embodiments, the third system information includes additional parameters to those of the indicated system information blocks of the one or more system information blocks. In various embodiments, the first system information, the second system information, the third system information, or some combination thereof is discarded after a predetermined period of time. In some embodiments, the one or more system information blocks include a first system information block of a first type and a second system information block of the first type, and the first and second system information blocks are different from one another.

In one embodiment, the second system information includes scheduling information for system information blocks broadcast regularly, system information blocks not broadcast regularly, system information blocks using the first configuration without the second configuration, system information blocks using the first configuration with the second configuration, or some combination thereof. In certain embodiments, the second system information includes a two-bit indication for each system information block indicating whether the respective system information block is broadcast regularly, not broadcast regularly, uses the first configuration without the second configuration, or uses the first configuration with the second configuration.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising:
transmitting, from a user equipment, a first on-demand request for a system information block;
receiving, at the user equipment, the system information block;
obtaining, at the user equipment, configuration information indicating which system information blocks of a plurality of system information blocks a timer applies to;
in response to receiving the system information block and in response to the system information block being part of the system information blocks of the plurality of system information blocks the timer applies to, starting the timer;
discarding the system information block a predetermined time after the timer is started; and
transmitting, in response to discarding the system information block and the system information block being provided on demand, a second on-demand request for the system information block to reacquire the discarded system information block, wherein a validity of the system information block is based on an area inside of a public land mobile network area corresponding to the system information block, the area inside of the public land mobile network area corresponding to the system information block is smaller than the public land mobile network area, and the area inside the public land mobile network area corresponding to the system information block comprises a specific limited tracking area, radio access network area, or paging area.

2. The method of claim 1, wherein receiving the system information block comprises receiving the plurality of system information blocks.

3. The method of claim 2, further comprising, in response to receiving the plurality of system information blocks, starting a corresponding timer corresponding to each system information block of the plurality of system information blocks.

4. The method of claim 3, further comprising discarding each system information block of the plurality of system information blocks the predetermined time after the corresponding timer is started.

5. The method of claim 1, wherein the predetermined time comprises three hours.

6. The method of claim 1, wherein discarding the system information block comprises deleting the system information block.

7. An apparatus comprising:
a transmitter that transmits a first on-demand request for a system information block;
a receiver that:
  receives the system information block; and
a processor that:
  obtains configuration information indicating which system information blocks of a plurality of system information blocks a timer applies to;
  in response to receiving the system information block and in response to the system information block being part of the system information blocks of the plurality of system information blocks the timer applies to, starts the timer; and
  discards the system information block a predetermined time after the timer is started;
wherein the transmitter transmits, in response to the processor discarding the system information block and the system information block being provided on demand, a second on-demand request for the system information block to reacquire the discarded system information block, and wherein a validity of the system information block is based on an area inside of a public land mobile network area corresponding to the system information block, the area inside of the public land mobile network area corresponding to the system information block is smaller than the public land mobile network area, and the area inside the public land mobile network area corresponding to the system information block comprises a specific limited tracking area, radio access network area, or paging area.

8. The apparatus of claim 7, wherein the receiver receiving the system information block comprises the receiver receiving the plurality of system information blocks.

9. The apparatus of claim 8, wherein the processor, in response to receiving the plurality of system information blocks, starts a corresponding timer corresponding to each system information block of the plurality of system information blocks.

10. The apparatus of claim 9, wherein the processor discards each system information block of the plurality of system information blocks the predetermined time after the corresponding timer is started.

11. The apparatus of claim 7, wherein the predetermined time comprises three hours.

12. The apparatus of claim 7, wherein the processor discarding the system information block comprises the processor deleting the system information block.

* * * * *